United States Patent
Wan

(10) Patent No.: US 9,625,966 B2
(45) Date of Patent: Apr. 18, 2017

(54) ENHANCED POWER OVER ETHERNET (POE) SYSTEM

(71) Applicant: Zmodo Shenzhen Technology Co., Ltd., Shenzhen (CN)

(72) Inventor: Kevin Kelin Wan, Champaign, IL (US)

( * ) Notice: Subject to any disclaimer, the term of this patent is extended or adjusted under 35 U.S.C. 154(b) by 0 days.

(21) Appl. No.: 14/657,800

(22) Filed: Mar. 13, 2015

(65) Prior Publication Data
US 2015/0293571 A1    Oct. 15, 2015

Related U.S. Application Data

(60) Provisional application No. 61/977,258, filed on Apr. 9, 2014.

(51) Int. Cl.
G06F 1/26 (2006.01)
H04L 12/10 (2006.01)
H04N 5/232 (2006.01)
G08B 13/196 (2006.01)

(52) U.S. Cl.
CPC .............. *G06F 1/266* (2013.01); *H04L 12/10* (2013.01); *G08B 13/19654* (2013.01); *H04N 5/23241* (2013.01)

(58) Field of Classification Search
CPC ................................ G06F 1/266; H04L 12/10
See application file for complete search history.

(56) References Cited

U.S. PATENT DOCUMENTS

| | | | | |
|---|---|---|---|---|
| 2007/0236853 A1* | 10/2007 | Crawley | ................. | H04L 12/10 361/119 |
| 2008/0005626 A1* | 1/2008 | Schaff | .................. | G06F 1/3203 714/48 |
| 2012/0113265 A1* | 5/2012 | Galvin | ............... | H04N 5/23206 348/159 |

OTHER PUBLICATIONS

12/24V DC powered 803.3at POE switches, Veracity, 2013, 5 pages.*

* cited by examiner

*Primary Examiner* — Stefan Stoynov

(57) ABSTRACT

Disclosed herein is an enhanced POE (Power Over Ethernet) power supply system, in which a single power source is configured to provide a reduced power voltage for both a network video recorder and an IP camera, thereby simplifying a traditional POE system that requires additional devices for power transformation.

13 Claims, 1 Drawing Sheet

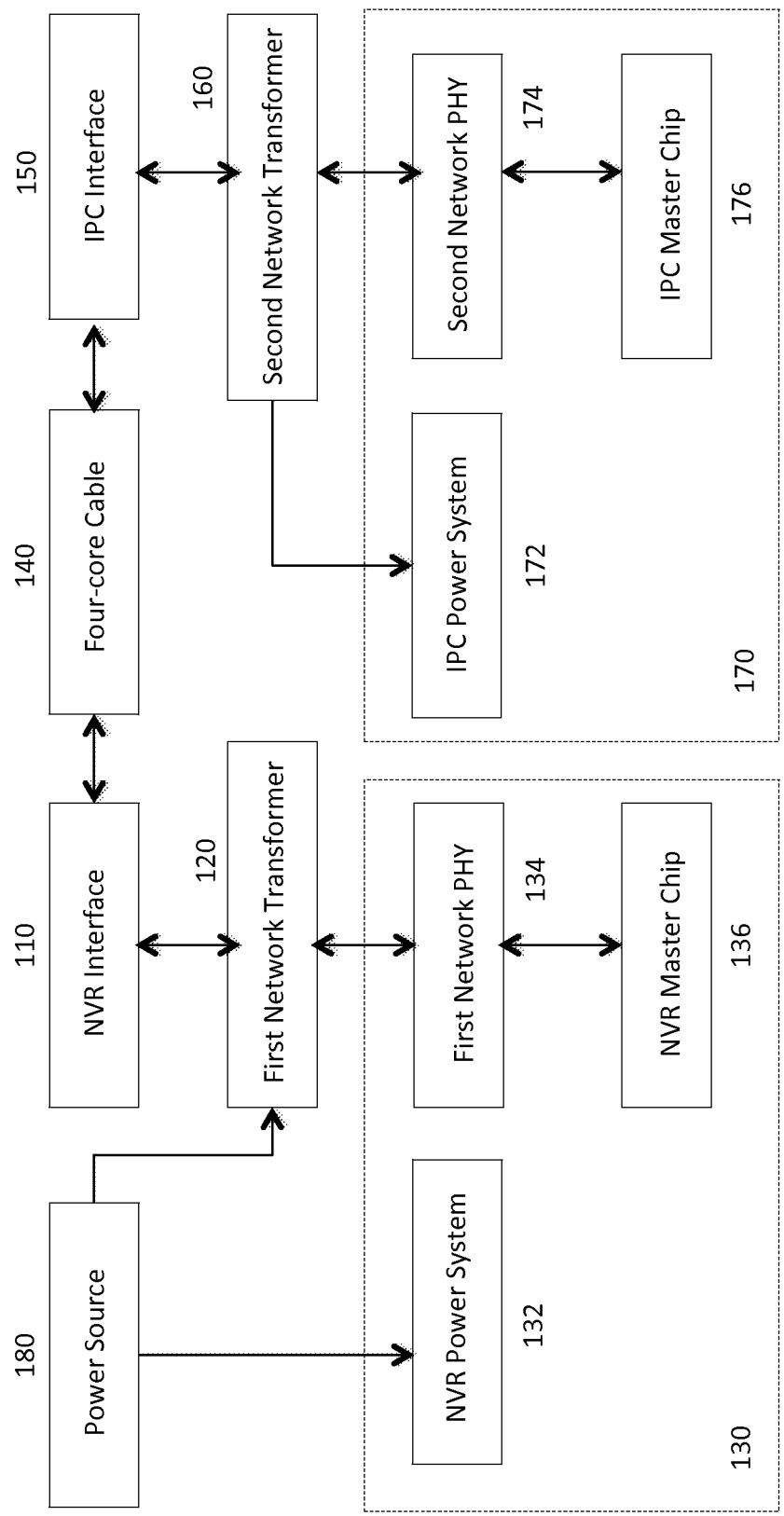

ENHANCED POWER OVER ETHERNET (POE) SYSTEM

CROSS-REFERENCE TO RELATED APPLICATION

This application claims priority to the U.S. provisional application 61/977,258, filed on Apr. 9, 2014, entitled "An Enhanced Power Over Ethernet (POE) System," all of which is hereby incorporated by reference in its entirety.

FIELD OF THE INVENTION

The present invention generally relates to security and prevention monitoring technologies, and more particularly, an enhanced PoE (Power over Ethernet) system for security monitoring devices.

BACKGROUND

With the improvement of network transmission quality, NVR (Network Video Recorder) and IPC (IP Camera) will replace the traditional DVR (Digital Video Recorder) and analog camera in the field of security monitoring. Importantly, to ensure such security-monitoring devices as NVR and IPC keep operating in the network, effective and consistent power supply systems are needed. Amongst different power supply systems, a well-adopted standard is called POE (Power Over Ethernet). POE is a kind of power-supply distribution technology, which transmits both power and data to Ethernet connection devices simultaneously and thus overcomes the defect of IPC single supply.

However, the traditional POE technology adopts a power supply of 48V, exceeding the 36V safe voltage. It also requires a special 48V adapter and a voltage-dropping module on the IPC terminal, which results in poor security and high costs. Therefore, there is a need for a safe and low-cost POE power supply system.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

Embodiments of the present invention provide a simplified POE power supply system, in which a power source is configured to provide a reduced power voltage for both a network video recorder and an IP camera, thereby simplifying the traditional POE system that often requires additional devices for power transformation. In one embodiment, the reduced power voltage is as low as 19V.

One embodiment of the present invention provides a simplified Power Over Ethernet (POE) power supply system, which comprises: a single power source providing power for both a network video recorder (NVR) and an IP camera (IPC) coupled to the NVR over a network, wherein the power source is configured to supply a voltage lower than 48V for the system.

Another embodiment provides a simplified Power Over Ethernet (POE) power supply system, which comprises a network video recorder (NVR) including an NVR power system; an IP camera (IPC) coupled to the NVR over a network, the IPC including an IPC power system; and a single power source coupled to the NVR power system, the power source configured to supply a power voltage of 19V for both the NVR and IPC, wherein the power source is further coupled to a first network transformer, the first network transformer connecting the NVR with an NVR interface, the NVR interface connected with a four core cable, the four core cable connected with an IPC interface, and the IPC interface connected to a second network transformer coupled to the IPC.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following FIGURES. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 1 is a block diagram illustrating representative modules in a simplified POE system according to embodiments of the present invention.

DETAILED DESCRIPTION OF EXEMPLARY EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to an enhanced POE system in support of security monitoring devices such as NVR and IPC. Specifically, a simplified POE system is provided, in which a power source is configured to provide a reduced power voltage for both a network video recorder and an IP camera, thereby simplifying the traditional POE system that often requires additional devices for power transformation. In one embodiment, the reduced power voltage is 19V.

1. System Components

Referring to FIG. 1, a simplified POE power supply system according to embodiments of the invention is illustrated. As shown in FIG. 1, this simplified POE power supply system includes an NVR interface 110, a first network transformer 120, a Network Video Recorder (NVR) 130, four-core cable 140, an IPC interface 150, a second network transformer 160, an IP Camera (IPC) 170 and a power source 180.

In one embodiment, the supply voltage of the power supply 180 is 19V, much lower than the 48V power supply required of a traditional POE system. The power level can be reduced down to 19V on the condition that the LAN transmission distance is less than 100 m. Because the 19V power supply is larger than 12V even after attenuating through the four-core cable 140, the voltage requirements of an IP camera such as the IPC 170 would be satisfied. Moreover, the 19V power supply would not damage the IP camera, and as a result, the traditional semiconductor chip that is used to distinguish an ordinary IP camera from the POE-based IP camera can be removed.

Back to FIG. 1, the NVR interface 110 is coupled to the NVR 130 via the first network transformer 120. That means, in one embodiment, the first network transformer 120 is connected with the NVR interface 110 on one end, and the NVR 130 on the other end. It should be understood that, although not shown in FIG. 1, the NVR interface 110 can also be connected to a router and other network devices.

In certain embodiments, the NVR interface 110 can operate without being connected to the first network transformer, in which case, however, the transmission distance can be limited, also causing disturbance in the external chip. Thus, the first network transformer 120 is used for signal leveling coupling to help enhance the signal for increased transmission distance, increase the system capacity of resisting disturbance, and provide protection for internal chips from lightning shock damages. The first network transformer 120 can be connected to different leveling interfaces without affecting other devices in the network.

The NVR 130 further includes an NVR power system 132, a first network PHY 134 and an NVR master chip 136. The NVR power system 132 supplies power to the NVR 130. In one embodiment, the NVR power system 132 is configured to reduce voltage by DC-DC, for example, reduce the 19V supply voltage down to 12V for the NVR 130. The first network PHY 134 is connected to the NVR master chip 136. PHY usually refers to the physical layer, i.e., the bottom layer of the OSI (Open System Interconnection) architecture. In this case, the first network PHY 134 refers to the chip connecting to the external signal interface.

The four-core cable 140 is used to connect the NVR interface 110 and IPC interface 150 for data communication between the network radio recorder 130 and IP camera 160. In one embodiment, the four-core cable 140 adopts the 1236 power supply mode of a traditional POE system for power and data transmission with 100 Mbps network. The single IP camera can transmit 1080P or even higher bit rate through 100 Mbps network without jammed frames. It should be understood that the four-core cable 140 can be replaced with an ordinary eight core cable or any other suitable types of cables.

The IPC interface 150 is used to connect with the IP camera 170. In one embodiment, the simplified POE power supply system also includes a second network transformer 160. Alternatively, the second network transformer 160 can be omitted, although its omission would limit the transmission distance and disturb the external chip. Thus, the second network transformer 160 is used for signal leveling coupling to help enhance the signal for farther transmission distance, increase the system capacity of resisting disturbance, and provide protection for internal chip from lightning shock. The second network transformer 160 can be connected to different leveling interfaces without affecting other devices in the network.

The IPC 170 includes an IPC power system 172, a second network PHY 174 and an IPC master chip 176. The IPC power system 172 is configured to supply power to the IPC 170. As the chip connected with the external signal interface, the second network PHY 174 is connected with the IPC master chip 176. In one embodiment, the voltage-dropping module within a transformer typical of the traditional POE system is not needed. Instead, the axial tap of the 19V voltage is derived through the second network transformer 160, which connects the IPC 170 with the original DC-DC circuit.

2. The Power Supply Process

To start with, the power source 180 is turned on to supply power to the terminal axle of the NVR power system 132 and the first network transformer 120. In one embodiment, the supplied power voltage is 19V. The NVR power supply system 132 reduces the voltage by DC-DC and transforms the 19V voltage to 12V, which is provided to the NVR 130. At the same time, the 19V power is transmitted to the four-core cable 140 via the output terminal axle of the network transformer 120 and the NVR interface 110. The 19V power passing onto the four-core cable is transmitted to the output terminal of the second network transformer 160 through the IPC interface 150, and further, through the output terminal axle of the second network transformer 160 to the IPC power supply system 172.

3. The Data Exchange Process

For data to be transmitted from the NVR 130 to the IPC 170, the NVR master chip 136 starts with transmitting data signals to the first network PHY 134 through RGMII (Reduced Gigabit Media Independent Interface) of the chip and other network interfaces. The first network PHY 134 then transforms received digital signals to analog differential signals. The differential signals are transformed into corresponding analog signals by the first network transformer 120. As such, the resulting analog signals are transmitted into the four-core cable 140 via the NVR interface 110. Subsequently, the analog signals through the four-core cable 140 are transmitted to the second network transformer 160 via the IPC interface 150. The second network transformer 160 transforms the analog signals into analog differential signals, which are transmitted to the second network PHY 174, which transforms the analog differential signals to digital signals. Then, the IPC master chip 176 receives the resulting digital signals.

When data is transmitted from the IPC master chip 176 to the NVR master chip 136, a similar transmission process is applied in the opposite direction. At first, the IPC master chip 176 transmits data signals to the second network PHY 174, which then transforms the received digital signals to analog differential signals. The differential signals are further transformed into corresponding analog signals by the second network transformer 160. The resulting signals are then transmitted through the IPC interface 150, the four-core cable 140, the NVR interface, and finally, received at the first network transformer 120. The first network transformer 120 transforms the received signals into analog differential signals, which then, via the first network PHY 134, are transformed into digital signals for the NVR master chip 136 to receive.

A traditional POE system usually uses 48V as the power supply, coupled with many 1V power adapters. In the above-demonstrated simplified POE system, the power supply can be significantly reduced down to 19V power supply, which provides a safe voltage lower than 36V. Such system design and configuration can also increases the system security and decrease the building costs. Moreover, the 19V power supply would not damage ordinary IP cameras. As a result, there is no more need for such traditional chip that is required to distinguish ordinary IP cameras from and POE-based IP cameras.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A simplified Power Over Ethernet (POE) power supply system, comprising:
   a network video recorder (NVR);
   an IP camera (IPC) coupled to the NVR over a network;
   an NVR interface connecting to the NVR, the NVR including an NVR power system;
   an IPC interface connecting to the IPC, the IPC including an IPC power system;
   a network cable connecting the NVR interface with the IPC interface, the cable configured for transmitting data between the NVR and IPC; and
   a single power source providing power for both the NVR and IPC, wherein the power source is configured to supply a voltage lower than 48V for the system.

2. The system as claimed in claim 1, wherein the power source supplies a power voltage of 19V.

3. The system as claimed in claim 1, wherein the network cable is a four-core cable.

4. The system as claimed in claim 3, wherein the four-core cable is configured to transmit power and data between the NVR and IPC over the network.

5. The system as claimed in claim 1, further comprising a first network transformer connecting the power source and the NVR interface.

6. The system as claimed in claim 1, further comprising a second network transformer connecting the IPC interface and the IPC power system of the IPC.

7. The system as claimed in claim 1, wherein the NVR interface is configured to connect with a router in the network.

8. A simplified Power Over Ethernet (POE) power supply system, comprising:
   a network video recorder (NVR) including an NVR power system;
   an IP camera (IPC) coupled to the NVR over a network, the IPC including an IPC power system; and
   a single power source providing power for both the NVR and IPC,
   wherein the single power source is coupled to the NVR power system and connected to the IPC power system through one or more network devices comprising an NVR interface and an IPC interface, and wherein the power source is configured to supply a power voltage of lower than 48V for both the NVR and IPC, and wherein the NVR interface is further connected with a four-core cable that is further connected with the IPC interface.

9. The system as claimed in claim 8, wherein the one or more network devices further comprise a first network transformer connecting the NVR with the NVR interface.

10. The system as claimed in claim 8, wherein the IPC interface is further connected to a second network transformer that is coupled to the IPC.

11. A method for providing power in a security monitoring system, comprising:
    configuring a single power source to supply a power voltage of lower than 48V for both a network video recorder (NVR) and an IP camera (IPC) connected to the NVR over a network, wherein the single power source is coupled to an NVR power system in the NVR and further connected to an IPC power system in the IPC via one or more network devices, wherein the one or more network devices comprise a NVR interface and an IPC interface, and wherein the NVR interface is connected to a first network transformer, the IPC interface is connected to a second network transformer, and the NVR interface and the IPC interface are connected via a four-core cable.

12. The method of claim 11, further comprising:
    supplying a first power voltage from the single power source to the NVR power system;
    at the NVR power system, transforming the first power voltage down to a second power voltage and supplying the second power voltage to the NVR; and
    supplying the first power voltage from the single power source to the IPC power system by transmitting the first power voltage through the first network transformer, the NVR interface, a four-core cable, the IPC interface and the second network transformer.

13. The method of claim 12, further comprising:
    generating a first signal at the NVR;
    transforming the first signal to a second signal at a first PHY in the NVR;
    transmitting the second signal to the first network transformer and transforming the second signal to a third signal at the first network transformer;
    transmitting the third signal from the first network transformer through the NVR interface, the four-core cable, the IPC interface to the second network transformer;
    transforming the third signal back to the second signal at the second network transformer;
    transmitting the second signal to a second PHY in the IPC and transforming the second signal back to the first signal at the second PHY; and
    receiving the first signal at the IPC.

* * * * *